US006068716A

United States Patent [19]

Higgins

[11] Patent Number: 6,068,716

[45] **Date of Patent: *May 30, 2000**

[54] METHOD AND APPARATUS FOR LABELING DOCUMENTS

[75] Inventor: James T. Higgins, Grosse Pointe Park, Mich.

[73] Assignee: DocuTag, LLC, Detroit, Mich.

[ * ] Notice: This patent is subject to a terminal disclaimer.

[21] Appl. No.: 08/936,452

[22] Filed: Sep. 24, 1997

Related U.S. Application Data

[63] Continuation of application No. 08/542,722, Oct. 13, 1995, Pat. No. 5,716,469, which is a continuation-in-part of application No. 08/263,944, Jun. 22, 1994, abandoned, which is a continuation of application No. 08/026,553, Mar. 4, 1993, abandoned.

[51] Int. Cl.$^{7}$ ................................ B65C 1/02; B65C 5/02; B32B 31/04

[52] U.S. Cl. ............................ 156/64; 156/249; 156/277; 156/DIG. 2; 156/DIG. 20

[58] Field of Search .............................. 156/64, 247, 277, 156/541, 542, DIG. 33, DIG. 49, 249, DIG. 2, DIG. 20

[56] References Cited

U.S. PATENT DOCUMENTS

| | | | |
|---|---|---|---|
| 3,405,021 | 10/1968 | Marano | 156/542 X |
| 3,586,578 | 6/1971 | Dickerson | 156/541 X |
| 4,024,011 | 5/1977 | Crankshaw et al. . | |
| 4,207,814 | 6/1980 | Schenk . | |
| 4,329,191 | 5/1982 | Barber . | |
| 4,439,257 | 3/1984 | Sato et al. . | |
| 4,630,538 | 12/1986 | Cushman . | |
| 4,639,287 | 1/1987 | Sakura . | |
| 4,670,081 | 6/1987 | Takahashi et al. | 156/542 X |
| 4,715,621 | 12/1987 | Colavito et al. . | |
| 4,743,319 | 5/1988 | Ramcke . | |
| 4,826,558 | 5/1989 | Wada et al. . | |
| 4,857,121 | 8/1989 | Markley et al. . | |
| 4,917,523 | 4/1990 | Merrick et al. . | |
| 4,969,305 | 11/1990 | York et al. . | |
| 5,000,815 | 3/1991 | Hanna . | |
| 5,076,879 | 12/1991 | Svyatsky et al. . | |
| 5,133,396 | 7/1992 | Selak et al. . | |
| 5,141,593 | 8/1992 | Fowler . | |
| 5,162,069 | 11/1992 | Morris . | |
| 5,197,764 | 3/1993 | Hicinbothem et al. . | |
| 5,716,469 | 2/1998 | Higgins | 156/277 X |

*Primary Examiner*—Curtis Mayes

*Attorney, Agent, or Firm*—Harness, Dickey & Pierce, PLC

[57] ABSTRACT

A method and apparatus for labeling documents uses an electronic computer to generate the sequential information required to be placed on each label. This information is then transferred to a printing device which transfers this sequential information onto each individual label. Once the labels are printed in a sequential manner, they are fed into a dispenser which individually or in groups, dispenses the labels in a sequential manner. In order to eliminate any turning of the labels or the documents, the printing device prints the labels in an inverted manner such that they exit the dispenser in an upright legible manner.

5 Claims, 1 Drawing Sheet

METHOD AND APPARATUS FOR LABELING DOCUMENTS

This is a continuation of U.S. Ser. No. 08/542,722, filed Oct. 13, 1995 now U.S. Pat. No. 5,716,469, which is a division of U.S. Ser. No. 08/263,944, filed Jun. 22, 1994, now abandoned, which is a continuation of U.S. Ser. No. 08/026,553, filed Mar. 4, 1993, now abandoned.

FIELD OF THE INVENTION

The present invention relates to a method and apparatus for sequentially labeling documents. More particularly, the present invention relates to a method and apparatus for providing sequentially identified labels for application onto a series of documents or pages.

BACKGROUND OF THE INVENTION

There are a wide variety of business and legal applications where it becomes necessary to sequentially identify documents or individual pages of documents. This is normally necessary when providing copies of these documents or individual pages to other parties, thus assuring the party receiving the documents that they have received every document or individual page in the series. In the legal profession, it is common practice for the judges to require plaintiff's and defendant's counsel to submit documents to the court that are identified by a unique page number within a universe of individually numbered documents. Typical documents which have these requirements are the documents that have been produced during discovery by all parties.

The process of assigning sequential page numbers to a large volume of documents (often greater than 1,000,000 pages) is a tedious, time consuming and labor intensive task. The process typically requires assigning one person at a time to affix a sequential number to each page from the first page through the last. Numbering from beginning to end provides a continuous sequence of numbers as evidence that there are no omitted documents (implied by missing numbers in the sequence).

The prior art method of sequentially labeling these documents has been to use a hand operated stamping machine. These stamping machines are normally a manually operated ink stamp which is capable of sequentially changing the number which is being stamped. For the convenience of the individual doing the stamping, the prior art hand stamping machines have been developed to offer a variety of patterns by which they change their number. This can include after every page, after every other page or number by twos. The hand stamping machines have been around for numerous years and while they have been effective in providing a means for sequentially numbering a series of documents, they are not without their problems.

One problem associated with these prior art hand stamping machines is the inconsistency with which the identifying number is printed. The hand stamping machine is an ink stamp which relies on various factors to insure a legible stamped number. These factors include the amount of ink available on the stamp pad, the pressure at which the stamp is applied, the flatness or consistency of the document being stamped, the alignment of the tumblers containing the individual numbers as well as various other factors. When any one or more than one of these factors are less than optimum, the quality and legibility of the stamped number will deteriorate.

Another problem associated with the prior art hand stamping machines is the handling of the documents which need to be stamped. When numbering each page, great care must be given to place the sequential number on a page location which will not obscure the contents of the original document. This can mean a constant movement or rotation of each document in order to properly locate the sequential number. When using a hand stamping machine, the operator is required to dedicate one hand to the hand stamping machine itself thus leaving only one hand free to manipulate stacks of original documents. Thus the time involved in placing these sequential numbers on a large number of documents is substantial.

An additional problem associated with the prior art hand stamping machines is the amount of physical strength and endurance required from the operator to maintain a productive pace in processing the documents. The continuous and repetitive movements required to operate the hand stamping machines for a large volume of documents will rapidly lead to fatigue which will in turn affect both the speed at which documents are processed as well as the legibility of the numbers being stamped.

Further, some documents must also be identified, on occasion, with additional descriptions such as "Confidential" or "Protected". In addition, it may be desirable to place some additional type of notation on various subjects of documents within a series without affecting the sequential numbering of the series of documents. Finally, with the increasing use of computers to track and inventory documents, a bar code may be desirable or required on each document in addition to the sequential number. For each of the above mentioned needs or requirements, the hand stamping machine are incapable of producing the additional information during the hand stamping process. Thus, an additional separate stamping or identification procedure must be performed.

Accordingly, there is a need for a method and apparatus for sequentially identifying individual documents or pages within a series of documents which overcomes the above mentioned problems associated with the prior art hand stamping machines.

SUMMARY OF THE INVENTION

The present invention provides the art with a method and apparatus for sequentially labeling documents. The method and apparatus of the present invention utilizes an electronic computer to generate the required information and format of the information to be placed on individual adhesive labels, a printer for imprinting the information on the individual labels and a dispensing device for systematically presenting the labels to the individual labeling the documents.

Other advantages and objects of the present invention will become apparent to those skilled in the art from the subsequent detailed description, appended claims and figures.

DESCRIPTION OF THE DRAWINGS

In the figures which illustrate the best mode presently contemplated for carrying out the present invention.

DESCRIPTION OF THE PREFERRED EMBODIMENT

While the invention is susceptible of various modifications and alternative forms, specific embodiments thereof have been shown by way of example in the figures and will hereinafter be described in detail. It should be understood, however, that it is not intended to limit the invention to the particular form disclosed, but to the contrary, the invention is to cover all modification, equivalents and alternatives falling within the spirit and scope of the invention as expressed in the appended claims.

Figure 1:
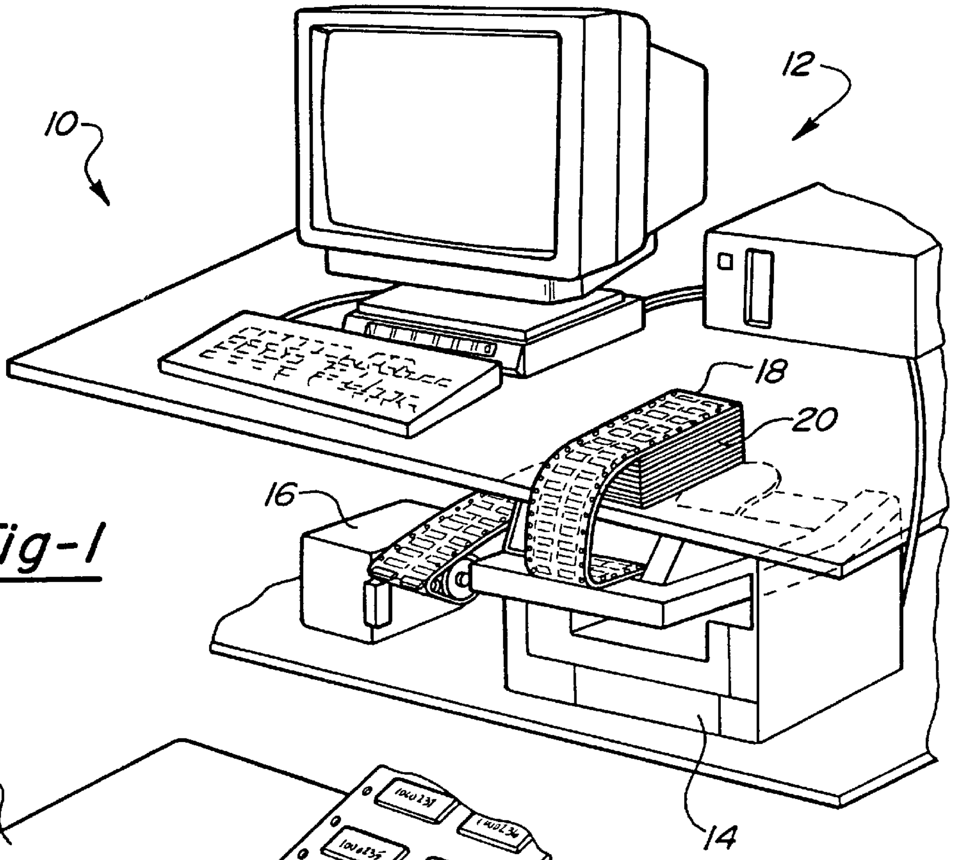
FIG. 1 is a perspective drawing of the labeling system of the present invention.

Referring now to the figures in which like reference numerals designate like or corresponding parts throughout the several views, there is shown in FIG. 1 a labeling system in accordance with the present invention which is generally designated by the reference numeral 10. Labeling system 10 comprises a conventional electronic computer 12, a printing device 14 and a dispensing device 16. Labeling system 10 is operable to calculate, print and dispense labels 18 from individual sheets (not shown) or from an indefinite length fan folded supply of labels 20 as shown in FIG. 1.

Electronic computer 12 is of a conventional design and is capable of generating a sequential numbering pattern with fixed alpha/numeric fields duplicated to each pattern. Computer 12 preferably utilizes a DOS software program which is capable of formatting specific information on a predefined size of label. While there are a large number of commercial software programs available for use with computer 12, it has been found that Labels Unlimited by Power Up is especially well suited to the present invention as it has the capabilities of printing both the sequential number and the alpha/numeric fields in an inverted format which aids in the placement of the labels as will be described later herein.

Upon receiving the information to be printed from computer 12, printing device 14 transfers or prints this information onto the supply of blank labels 20 fed into printing device 14. As mentioned above, printing device 14 prints the sequential number and the fixed alpha/numeric fields in an inverted format. This inverted format allows for the feeding of the labels into dispensing device 16 such that the sequential number and the fixed alpha/numeric fields are easily readable and readily fixable as will be described later herein.

Printing device 14 can be any type of conventional printer which is compatible and able to communicate with the computer software being used by computer 12. Printer 14 can be a dot matrix printer, a bubble jet printer, a laser printer or a thermal printer. Printing device 14 not only has to be compatible and able to communicate with the computer software being run on computer 12, printing device 14 must also have the ability to feed the bulk supply of labels whether they be individual sheets, or an endless fanfold supply designed to be tractor fed. The preferred printing device 14 is a dot matrix printer as it has the capabilities of frictionally feeding individual sheets or tractor feeding an endless supply of fan folded labels. In addition, a dot matrix printer is capable of printing various types of alpha/numeric characters as well as universal bar code labels in an inverted manner.

Figure 2:
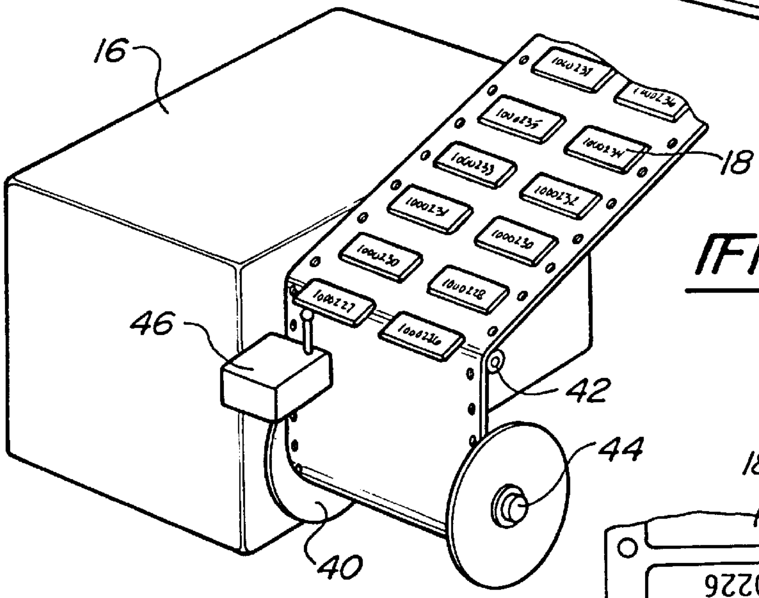
FIG. 2 is a perspective view show the dispensing device of the present invention.

Dispensing device 16, as best shown in FIG. 2, is also of a conventional design and includes a feeding mechanism 40 and a stripping mechanism 42. Preferably dispensing device 14 is manufactured by Dispensamatic, model number U45. Dispensing device 16 may be connected. in series with computer 12 and printing device 14 as shown in FIG. 1, or dispensing device 16 may be remotely located from computer 12 and printing device 14. When dispensing device 16 is located remotely from computer 12 and printing device 14, a pre-printed quantity of labels may be supplied to dispensing device 16. This would allow one computer 12 and one print device 14 to generate a plurality of pre-printed labels, each based upon a separate universe of individually numbered labels. The affixing of the labels can then be accomplished at a different place and/or at a different time.

Feeding mechanism 40 of dispensing device 16 is located after stripping mechanism 42 and preferably comprises a take-up wheel 44 for accumulating the continuous supply of backing material from the supply of labels. Take-up wheel 44 pulls the supply of labels over stripping mechanism 42. Stripping mechanism 42 is a knife-like edge which folds the supply of labels over and around a relatively small radiused surface. As the backing material goes around this radius, the individual labels separate from the backing material due to the labels being made from a somewhat stiffer material. As the individual labels 18 come off of the backing material, they trip a microswitch 46 which deactivates the feeding mechanism. Thus, an individual label or a group of individual labels will always be presented to the operator. When the label which triggered microswitch 46 is removed, feeding mechanism 40 advances the supply of labels until the next label trips microswitch 46. In some instances, it may be advantageous to place a mechanism between the supply of labels and stripping mechanism 42 to place a drag on the labels. This drag would then insure separation of the labels from the backing material due to the fact that the drag force would insure that the backing material traverses the entire portion of the radius of stripping mechanism 42.

As mentioned above, computer 12 has the ability to format the information on the labels such that printing device 14 will print the information in an inverted fashion. This insures that the information contained on the labels will be right side up as they exit dispenser device 16 thus allowing for both the reading of the information by the operator as well as eliminating any need for the operator to rotate the document or the label in order to affix the label in an upright position.

Figure 3:
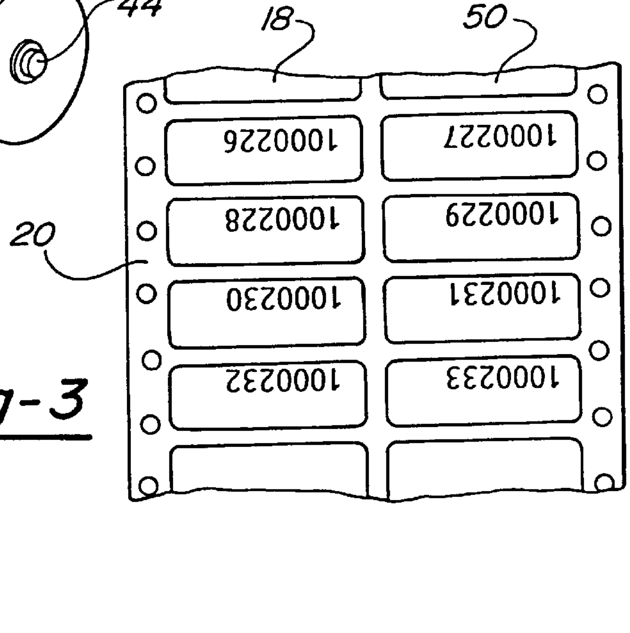
FIG. 3 is a plan view of a typical section of continuous label after being printed.

FIG. 3 shows a pre-printed segment of a preferred endless supply of labels 20 which are designed to be tractor fed. The supply of labels 20 have two labels 18 side by side. Each label 18 is approximately 1.5 inches by 0.5 inches which then provides a backing of not more than 4.5 inches. The labels can be made from paper or the labels can be made from a clear plastic if there is a concern for locating the label without covering information on the document. As can be easily seen from the printed information in FIG. 3, the inverted printing of the information allows for the proper feeding of the labels into dispensing device 16. The output side 50 of the supply of labels 20 from printing device 14 becomes the input side for dispensing device 16 thus requiring the inverted printing if the labels are to be fed in an upright readable manner.

The operation of the system begins with the computer 12 generating the information to be printed on the individual labels. This information may include numbers, alpha/numeric information, bar codes or any combination of these. This information is properly formatted for the type of printing device 14 and the dimensions of labels 18 and then sent to printing device 14. Printing device 14, after being supplied with a supply of blank labels 20, transfers or prints the information on individual labels 18 in an inverted manner. The printed supply of labels is then sent to dispensing device 16, either immediately in series with computer 12 and printing device 14, or being separately supplied to dispensing device 16. Labels are then affixed sequentially to the individual documents, the labels being automatically dispensed by dispensing device 16.

While the above detailed description describes the preferred embodiment of the present invention, it should be understood that the present invention is susceptible to modification, variation and alteration without deviating from the scope and fair meaning of the subjoined claims.

What is claimed is:

1. A method of organizing a random set of documents, said documents including a face and indicia relating to a specific subject matter, said method comprising the steps of:

generating a plurality of alpha/numeric identification figures on a computer, said alpha/numeric identification figures being generated in a sequential order;

supplying a plurality of blank labels to a printing device, said plurality of blank labels being carried on an elongated flexible substrate;

printing each of said plurality of alpha/numeric figures onto one blank label of said plurality of blank labels to create a plurality of printed labels, each of said plurality of printed labels being unique to a universe of identifying information and arranged in said sequential order on said flexible substrate;

supplying said plurality of printed labels to a dispenser;

actuating said dispenser to pull said flexible substrate over an edge to separate each of said printed labels in said sequential order;

deactivating said dispenser when at least one of said printed labels is separated from said flexible substrate;

selecting a location for each of said plurality of printed labels on said face of each document of said random set of documents, said location may vary on said face from document to document such that said printed label may be placed anywhere on said face so that information contained on said document is not obscured by said printed label;

manually affixing said printed label on said document of said random set of documents at said location; and organizing said random set of documents including indicia relating to said specific subject matter.

2. The method according to claim 1 wherein, said step of actuating said dispenser to pull said flexible substrate over an edge simultaneously separates a plurality of said printed labels.

3. The method according to claim 1 wherein, said step of supplying a plurality of blank labels supplies said blank labels in a plurality of rows to said printing device.

4. The method according to claim 3 wherein, said step of actuating said dispenser to pull said flexible substrate over an edge simultaneously separates a plurality of said printed labels.

5. The method of organizing a random set of documents according to claim 1 further comprising the steps of:

generating bar code information on said computer; and printing said bar code information onto said plurality of blank labels.

* * * * *